3,112,217
PROCESS AND COMPOSITION FOR ELECTRO-
STATIC SPRAY PAINTING
Lester L. Spiller, Indianapolis, Ind., assignor to Ransburg
Electro-Coating Corp., Indianapolis, Ind., a corporation
of Indiana
No Drawing. Filed May 19, 1961, Ser. No. 111,142
9 Claims. (Cl. 117—93.4)

The present invention relates to improvements in electrostatic spraying of paint and other coating compositions and to the modification of paint compositions including the provision of new paint compositions to achieve improved electrostatic sprayability. The present application represents a specific improvement falling within the generic invention taught in my prior copending application Serial No. 789,469, filed January 15, 1959, the disclosure of this prior application being incorporated by reference.

In accordance with the teachings of said prior application, a paint comprising a film-forming material dispersed in a liquid medium is provided with charged colloidal particles of one electrical sign having a diameter of at least 1000 A. and mobile counter-ions associated therewith, the charged particles being dispersed in the continuum of the paint which has dissolved therein a polar component having a dielectric constant in excess of 8. Preferably, a film-forming resin having a dielectric constant less than 8 is dissolved in a liquid organic solvent medium, a portion of which is a polar solvent having a Gordy number less than 50 and a dielectric constant of from 20–40 (to supply the polar component) and the charged particles and counter ions are formed by dissociation of a particulate component which has been associated by hydrogen bonding with a component of high Gordy number, e.g., a Gordy number in excess of 125, preferably in excess of 200.

The component of high Gordy number, which is indicative of a strong tendency for hydrogen bonding, in accordance with the teachings of said prior application, is desirably a nitrogen base compound, preferably having a molecular weight in excess of 300. The disclosure includes reference to the use of hydroxyl amines such as octadecyl hydroxyl amine, there being little to recommend this compound as opposed to the numerous other nitrogen base compounds disclosed.

The present invention is based on the finding that the specific beta amino primary alcohol, 2-amino-2-methyl-1-propanol having the formula:

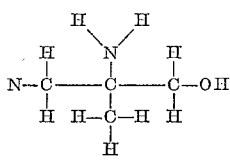

has exceptionally outstanding properties in permitting outstanding improvement in electrostatic atomization, even to the point of permitting very viscous paints to be easily and rapidly sprayed to provide unusually thick films considering spray application, and this is achieved with minimum modification of the paint, from the standpoint of the wet layer on the surface to be coated and especially from the standpoint of the final baked paint film from which the 2-amino-2-methyl-1-propanol has been evaporated by baking.

Many conventional paints such as ordinary house paints and highly pigmented interior decorators paints do not respond well to electrostatic atomization in which, as is well known, an electrostatic charge is passed through an increment of the paint, usually in the form of a film, to a grounded article to cause the paint to be disrupted to form a spray of fine paint particles which deposit upon the article to form a film of paint thereupon. As a result, prior electrostatic atomization normally utilized paints and other coating compositions of low solution viscosity, e.g., about 15–30 seconds as measured in a #4 Ford cup at 77° F. These same low solution viscosities are normally used in conventional air spray systems because more viscous solutions require higher spray pressure which leads to excessive material losses in the spray process. Unfortunately, low viscosity paint tends to run and sag when applied in increased thickness. In contrast, the invention permits effective electrostatic atomization to be achieved with paints having a solution viscosity of about 100 seconds, measured as indicated above, and coatings can be produced with these viscous paints which are considerably thicker than could heretofore be achieved in a single coat and without danger of running or sagging.

It is desired to point out that many paints and other coating compositions are very carefully formulated and balanced to provide optimum properties of wetting, flow and drying and to produce the best properties in the finished cured film. As a practical matter, effective modification for electrostatic sprayability must produce the least possible modification of other properties so as to be acceptable to the industry. The invention, in this respect, is an important contribution for 2-amino-2-methyl-1-propanol functions, in essence, as a soluble diluent having some solvent activity in solution. More particularly, 2-amino-2-methyl-1-propanol is soluble in common paint systems in which film-forming resin is at least partly dissolved in an organic solvent paint continuum which preferably is largely constituted by non-polar liquid hydrocarbon solvent without introducing compatibility problems and it is volatile under ordinary baking conditions so that it is largely eliminated from the cured coating.

As previously indicated, 2-amino-2-methyl-1-propanol becomes associated by hydrogen bonding with colloidal particles or micelles dispersed in the paint continuum. Some paints include resinous components of high molecular weight which form colloidal micelles having a capacity toward hydrogen bonding. These are illustrated by aldehyde condensation products with phenol, urea, melamine, dicyandiamide and benzoguanamine which are cooked with drying oils so as to be only partially soluble in the paint continuum. If the paint does not include colloidal particles or micelles of the required size and having a capacity for hydrogen bonding, these may be added. Thus, acidic clays typified by montmorillonite clay may be relied upon to supply the particulate component possessing hydrogen-donor functional groups needed for hydrogen bonding. Preferred acidic clays exhibit a comparatively high base exchange capacity, e.g., from about 15 to about 100 milliequivalents of exchangeable ion per 100 grams of clay. Chelate and clathrate compounds with polyvalent metals such as titanium chelates like triethanolamine titanate or clathrate complexes produced by reaction between urea and vegetable oil fatty acids, are also usable.

2-amino-2-methyl-1-propanol has a very strong capacity for hydrogen bonding. It is unusually effective in associating with particulate components containing electron donor functional groups and the complexes so formed effectively dissociate to provide the charged particles and associated mobile counter ions known as a "double layer" which appears to be responsible for the interaction with the unidirectional electrostatic field leading to improved electrostatic atomization.

The dissociation referred to requires the presence of polar materials as a third component. These polar materials should possess a dielectric constant in excess of about 8, preferably between 20 and 40. In order that the polar material facilitate dissociation of the complex of particulate component and 2-amino-2-methyl-1-propanol instead of merely displacing this compound in the complex, the polar material should have a Gordy number of less than 100, preferably less than 50. The polar component is illustrated by polar solvents such as nitroparaffins, esters such as butyl acetate and ketones. Typical perferred solvents which function well in accordance with the invention at low polar solvent concentration are acetyl acetone, methyl ethyl ketone, nitromethane, nitropropane, acrylonitrile monomer and acetonitrile. The greater the polarity and dielectric constant, and the lower the Gordy number of the polar solvent, the less of the polar solvent is required to effectively dissociate the complex of particulate component and 2-amino-2-methyl-1-propanol to provide a marked improvement in electrostatic atomization.

Proportions are of secondary importance in accordance with the invention. Preferably, at least about 1% by weight of the paint composition should be particulate component capable of hydrogen bonding. Where the particulate component is constituted by colloidal fragments of film-forming resin, the maximum proportion of particulate component is dictated by the paint system in question and is not directly related to electrostatic atomization except from the standpoint of some reasonable minimum viscosity which, in accordance with the invention, is far higher than usual spray viscosity. When the particulate component is specially selected for its capacity to participate in hydrogen bonding, e.g., an acidic clay of high base exchange capacity, less than 1% by weight is effective, e.g., as little as 0.1% by weight.

The 2-amino-2-methyl-1-propanol is used in an amount of from .1% to 5% based on the weight of the paint.

The third component which is normally a polar organic liquid should be dissolved in the liquid continuum of the paint in an amount sufficient to effect at least partial ionization of the complex formed by association of 2-amino-2-methyl-1-propanol. Desirably, at least about 3% by weight, based on the weight of the paint, should be present. Preferably, this liquid should be a solvent for the film-forming resinous constituents of the paint. Desirably, the polar organic liquid is present in an amount of at least 100% based on the weight of 2-amino-2-methyl-1-propanol.

Using the preferred materials characterized by a Gordy number of less than 50, it is preferred to employ not more than 8% by weight of polar solvent, based on the total weight of the paint. Up to about 25% by weight of polar solvent may be present, but even with less preferred solvents having a Gordy number of around 90, from 10–15% by weight is ample for the purpose of the invention. It should be kept in mind that there must be superimposed upon the requirements of the invention the desire in the paint industry to employ a minimum quantity of polar solvent in a practical paint formulation. The present invention is primarily directed to paints and other coating compositions in which the resinous film-forming component is present, at least partly, in solution and in which the resinous film-forming component has a dielectric constant less than 10, preferably a dielectric constant less than 7.

Paints modified by the addition of 2-amino-2-methyl-1-propanol and polar solvent to improve electrostatic sprayability in conventional manner. No differences in the significant physical and chemical properties could be detected.

Paints modified by the addition of 2-amino-2-methyl-1-propanol and polar solvent to improve electrostatic sprayability are not well adapted for conventional spraying in a normal air gun in comparison with the conventionally thinned formulation. In brief, the paint modifications dictated by the invention for electrostatic sprayability are not desirable modifications in the absence of electrostatic utilization.

Paints modified by the addition of 2-amino-2-methyl-1-propanol and which do not contain polar liquid to provide the double layer in accordance with the invention, are not significantly improved from the standpoint of electrostatic sprayability by the presence of the amino alcohol. Similarly, in the absence of a particulate component, the marked improvement achieved by the invention is not obtained.

Paints modified in accordance with the invention are well adapted for electrostatic atomization at viscosities of from 60–140 seconds measured as defined hereinbefore to produce coatings which will not run or sag on vertical surfaces, even when applied in thicknesses up to about 4 to 6 mils. In comparison, with other similar amino alcohols such as 2-amino-1-butanol, 2-amino-2-methyl-1,3-propanediol; 2-amino-2-ethyl-1,3-propanediol; tris (hydroxymethyl)-aminomethane; 2-dimethylamino-2-methyl-1-propanol and 2-dimethylamino-2-methyl-1-propanol, the electrostatic atomization achieved using 2-amino-2-methyl-1-propanol is significantly superior as is evidenced by the fact that the spot size produced (diameter) by the atomized particles is generally half as large under similar conditions of paint viscosity. Thus, with a given paint having a viscosity of from 80–110 seconds and containing 2-amino-2-methyl-1-propanol, electrostatic atomization at a constant delivery of 100 cc./min. can produce a spray pattern in which the spot size averages from about 8 to about 11 mils. In contrast, and under corresponding conditions of paint viscosity, delivery rate and ratio of paint to amino alcohol, other amino alcohols produced spot sizes ranging from 15 to 25 mils in diameter.

The invention is illustrated in the examples which follow:

For purposes of illustration, a specific oil-modified alkyd resin has been used as being representative. This specific oil-modified alkyd resin is detailed in Example 1.

EXAMPLE 1

An alkyd resin is prepared by polyesterification of approximately equimolecular proportions of pentaerythritol and orthophthalic acid, this alkyd being then cooked with 65 parts refined linoleic acids per 100 parts of alkyd until the mixture is compatible to provide an oil-modified alkyd resin. This resin is dissolved in odorless mineral spirits having a kauri-butanol value of about 30 and pigmented with a non-chalking and non-yellowing titanium dioxide rutile together with ½%, based on the total weight of pigment, of zinc oxide. 0.7 part of total pigment is used per part of oil-modified alkyd. Sufficient mineral spirits are used to provide a solution having a non-volatile solids content of 70%. The composition is then toned with ½% by weight of phthalocyanine green and driers are added to provide .04% of cobalt octoate and 0.5% of zirconium octoate.

EXAMPLE 2

Using the oil-modified alkyd resin coating composition of Example 1, this coating composition is thinned with the 2-amino-2-methyl-1-propanol component of the invention and also with various other polar solvents to form spray coating compositions of various viscosities which are then sprayed with conventional air spray equipment and with commercial electrostatic spray equipment, the results being reported in the table which follows:

*Table I*

| Run | Thinner | Volume Ratio Paint Ex. 1/ Thinner | Viscosity (seconds, #4 Ford Cup) | Max. Film Build-up on vertical surface (mils) | Delivery Rate (cc./min.) | Air Spray Pressure (p.s.i.) | Air Spray Spot size (mils) | Electrostatic Spray Spot size (mils) |
|---|---|---|---|---|---|---|---|---|
| 1 | 2-amino-2-methyl-1-propanol mixed with ethanol in a volume ratio of 2/7 | 10/1 | 77 | 3.0 | 100<br>200<br>300 | 12<br>20<br>30 | 22.7<br>24.9<br>24.0 | 9.3 |
| 2 | do | 15/1 | 104 | 2.5 | 100<br>200<br>300 | 12<br>20<br>30 | 21.4<br>27.5<br>25.7 | 8.0 |
| 3 | do | 20/1 | 107 | 2.0 | 100<br>200<br>300 | 12<br>20<br>30 | 25.0<br>26.4<br>27.6 | 10.1 |
| 4 | Methyl ethyl ketone | 4.3/1 | 15 | 1.0 | 100<br>200<br>300 | 12<br>20<br>30 | 14.0<br>11.6<br>14.0 | 12.0 |
| 5 | Methyl acetate | 6/1 | 19 | 1.5 | 100<br>200<br>300 | 12<br>20<br>30 | 15.2<br>16.4<br>14.5 | 11.2 |
| 6 | Ethanol | 15/1 | 46 | 1.0 | 100<br>200<br>300 | 12<br>20<br>30 | 22.8<br>28.2<br>30.0 | 13.8 |

Referring to runs 1, 2 and 3, it will be seen that the use of 2-amino-2-methyl-1-propanol provides a coating composition of high viscosity which is well adapted for electrostatic sprayability, as is generally established by the small spot size achieved. At the same time, the paint is not well adapted for air spray as is evidenced by the large spot size which is produced. In comparison, run 4 shows conventional thinning with methyl ethyl ketone. The electrostatic sprayability is reasonably good, but it is not as good as is achieved with the far more viscous coating compositions of runs 1, 2 and 3. Methyl ethyle ketone is an effective solvent to facilitate air sprayability, making it clear in comparison with runs 1, 2 and 3, that the paint modification taught by the invention is not a desirable modification for air spray compositions. As previously indicated, the use of 2-amino-2-methyl-1-propanol in accordance with the invention, permits thick films to be effectively sprayed and this representation is substantiated in Table I by the maximum film build-up.

Runs 5 and 6 demonstrate the same thing using methyl acetate and ethanol as thinning agents.

EXAMPLE 3

Again using the pigmented coating composition of Example 1 as the base paint material, 2-amino-2-methyl-1-propanol is mixed with ethanol in a volume ratio of 2/7 and various other amino alcohols are substituted for 2-amino-2-methyl-1-propanol for purposes of comparison, the results being reported in Table II which follows:

*Table II*

| Run | Thinner | Paint Ex. 1/Thinner Volume Ratio | Viscosity (Seconds, #4 Ford Cup) | Electrostatic Spray Spot size (mils) |
|---|---|---|---|---|
| 1 | 2/7 volume ratio of 2-amino-2-methyl-1-propanol and ethanol. | 10:1<br>15:1<br>20:1 | 77<br>104<br>107 | 9.3<br>8.9<br>10.1 |
| 2 | Same as 1 use 2-amino-1-butanol in place of the 2-amino-2-methyl-1-propanol of run 1. | 10:1<br>15:1<br>20:1 | 76<br>94<br>105 | 15.0<br>15.6<br>17.0 |
| 3 | Same as 1 use 2-amino-2-methyl-1,3-propanediol in place of the 2-amino-2-methyl-1-propanol of run 1. | 10:1<br>15:1<br>20:1 | 71<br>89<br>92 | 24.3<br>16.0<br>25.3 |
| 4 | Same as 1 use 2-amino-2-ethyl-1,3-propanediol in place of the 2-amino-2-methyl-1-propanol of run 1. | 10:1<br>15:1<br>20:1 | 96<br>120<br>126 | 18.8<br>17.5<br>23.6 |

NOTE: All spot size data were obtained at a constant handgun delivery of 100 cc./min.

As can be seen in Table II, all of the low molecular weight amino alcohols as a group are effective to enable improved electrostatic spraying of highly viscous paints, but 2-amino-2-methyl-1-propanol is uniquely superior.

EXAMPLE 4

A further paint is formulated to provide a typical oil-modified alkyd primer. The primer is formulated using a pentaerythritol-phthalate alkyd modified by cooking with 75 parts of linseed oil per 100 parts of alkyd. 30 parts of this oil-modified alkyd in solution in mineral spirits is milled with 44.0 parts of titanium dioxide rutile and 10.7 parts of calcium carbonate. 13.6 parts of mineral spirits are then added to provide a weight ratio of oil-modified alkyd resin to mineral spirits of 55/45. 1.7 parts of cobalt octoate drier is also dispersed in the paint.

EXAMPLE 5

Thinning the base paint of Example 4 with a mixture of 2-amino-2-methyl-1-propanol and ethanol in a volume ratio of 2/7 provides at a paint-thinner dilution of 10/1, a No. 4 Ford cup viscosity of 70 seconds and an electrostatic spray spot size of 5.4 mils. Using less thinner, a dilution ratio of 15/1 provides a No. 4 Ford cup viscosity of 94 seconds and an electrostatic spray spot size of 5.74 mils. Using still less thinner, a dilution ratio of 20/1 provides a No. 4 Ford cup viscosity of 123 seconds and an electrostatic spray spot size of 7.02 mils.

In contrast, dilution with methyl ethyl ketone in a paint-thinner ratio of 10/1 provides a viscosity of 23 seconds, but the electrostatic spray spot size is only lowered to 10.9 mils. Dilution with methyl acetate at the same volume ratio of 10/1 provides a paint viscosity of 24 seconds and is slightly more effective than methyl ethyl ketone to provide an electrostatic spray spot size of 9.2 mils.

Again, the far more viscous paints which can be formulated using 2-amino-2-methyl-1-propanol, provide better electrostatic sprayability than can be achieved using conventional thining agents and the more viscous paints formulated in accordance with the invention can be applied to provide a greater maximum film build-up on a vertical surface before running and/or saggnig is encountered.

All of the spot sizes referred to above were obtained at a delivery rate of 100 cc. per minute.

EXAMPLE 6

Again using the base paint of Example 1, the following additional data was obtained to provide a direct comparison at the same viscosities between the best composition which could be formulated in the absence of an amino alcohol and a similar paint modification formulated in accordance with the invention. The results are shown in Table III.

*Table III*

| Run | Formulation (parts by vol.) | Solids Content (percent by wt.) | Viscosity (seconds, #4 Ford Cup) | Max. applied film thickness on a vertical surface, mils | Electrostatic Spray Spot Size (mils) | | |
|---|---|---|---|---|---|---|---|
| | | | | | 100 cc./min. | 150 cc./min. | 200 cc./min. |
| 1 | 28.4—base paint Ex. 1<br>1—methyl acetate | 67.7 | 50 | 2.0 | 23.5 | 30.5 | 37.5 |
| 2 | 75—base paint Ex. 1<br>6—methyl acetate<br>2.5—xylol<br>1.5—2-amino-2-methyl-1-propanol | 63.5 | 50 | 3.5 | 17.0 | 19.0 | 24.5 |

It should be noted that the viscosities reported hereinbefore are all measured at room temperature immediately after formulation of the composition involved.

The invention is defined in the claims which follow:

1. A method of spraying a paint composition upon an article connected to ground comprising passing an electrostatic charge through an increment of paint comprising film-forming material at least partly dissolved in an organic liquid paint continuum, to the grounded article to cause the paint to be disrupted to form a spray of fine paint particles and deposit the paint as a film on said article, said paint further comprising charged colloidal particles of one electrical sign having a diameter of at least 1000 A. and mobile counter-ions associated therewith, said charged particles and counter-ions formed by dissociation of a particulate component associated by hydrogen bonds with a plurality of surrounding molecules of 2-amino-2-methyl-1-propanol, said charged particles being dispersed in said paint continuum which has dissolved therein a polar component having a dielectric constant in excess of 8 and a Gordy number less than 100.

2. A method as recited in claim 1 in which said film-forming material is a resin having a dielectric constant less than 10 at least partly dissolved in said paint continuum and said polar component is a liquid solvent for said resin, said solvent being present in an amount of from 3–25% by weight based on the weight of the paint.

3. A method as recited in claim 2 in which said film-forming resin has a dielectric constant less than 7 and said polar component has a Gordy number less than 50 and a dielectric constant of from 20–40.

4. A method as recited in claim 3 in which said paint has a solution viscosity of from 60–120 seconds measured at 77° F. in a #4 Ford cup.

5. A method of spraying a paint composition upon an article connected to ground comprising passing an electrostatic charge through an increment of paint comprising a film-forming resin having a dielectric constant less than 10 at least partly dissolved in a liquid organic solvent paint continuum, to the grounded article to cause the paint to be disrupted to form a spray of fine paint particles and deposit the paint as a film on said article, said paint further comprising charged colloidal particles of one electrical sign having a diameter of at least about 1000 A. and mobile counter-ions associated therewith, said charged particles and counter-ions formed by dissociation of at least 1% based on the weight of the paint of a particulate component associated by hydrogen bonds with 2-amino-2-methyl-1-propanol present in solution in said paint in from .1–5% based on the weight of the paint, said charged particles being dispersed in the solution continuum of film-forming resin in organic solvent and said organic solvent including at least 3% based on the weight of the paint of a polar solvent for said film-forming resin, said polar solvent having a Gordy number less than 50 and a dielectric constant of from 20–40.

6. A method as recited in claim 5 in which the film of paint on said article is baked to largely eliminate from the cured paint said 2-amino-2-methyl-1-propanol.

7. In a method of spraying a paint composition comprising passing an electrostatic charge through an increment of paint to cause the production of electrostatically charged paint particles which deposit upon a grounded target, the improvement comprising employing a paint comprising film-forming material at least partly dissolved in an organic liquid paint continuum, said paint further comprising charged colloidal particles of one electrical sign having a diameter of at least about 1000 A. and mobile counter-ions associated therewith, said charged particles and counter-ions formed by dissociation of a particulate component associated by hydrogen bonds with a plurality of surrounding molecules of 2-amino-2-methyl-1-propanol, said charged particles being dispersed in said paint continuum which has dissolved therein a polar component having a dielectric constant in excess of 8 and a Gordy number less than 100.

8. A paint composition adapted for electrostatic atomization and deposition comprising film-forming resin having a dielectric constant less than 10 dissolved in a nonpolar liquid hydrocarbon solvent paint continuum and containing dispersed pigment, said paint having dispersed in the continuous phase thereof charged colloidal particles of one electrical sign having a diameter of at least about 1000 A. and mobile counter-ions associated therewith, said charged particles and counter-ions formed by dissociation of particulate component with from .1–5% by weight based on the weight of the paint of 2-amino-2-methyl-1-propanol, the continuous phase of said paint having dissolved therein at least 3% by weight based on the weight of the paint of a polar component having a dielectric constant in excess of 8.

9. A paint composition as recited in claim 8 in which said polar component is a solvent for said film-forming resin having a Gordy number of less than 100.

References Cited in the file of this patent

UNITED STATES PATENTS

| 2,385,800 | Douty et al. | Oct. 2, 1945 |
| 2,523,650 | Dickson | Sept. 26, 1950 |
| 2,584,123 | Gruenwald | Feb. 5, 1952 |
| 2,684,656 | Ransburg | July 27, 1954 |

OTHER REFERENCES

Fischer et al.: "Organic Protective Coatings" (1953), Reinhold Publishing Corp., N.Y. (pp. 281–290 relied on). (Copy in Div. 25.)